(12) United States Patent
Acker et al.

(10) Patent No.: US 11,827,554 B2
(45) Date of Patent: Nov. 28, 2023

(54) METHOD AND SYSTEM FOR PRODUCING GLASSWARE

(71) Applicants: Gerresheimer Regensburg GmbH, Regensburg (DE); Gerresheimer Bünde GmbH, Bünde (DE)

(72) Inventors: Wolfram Acker, Kiel (DE); Richard Kiener, Oberviechtach (DE); Vladislav Löpp, Bünde (DE)

(73) Assignees: Gerresheimer Regensburg GmbH, Regenburg (DE); Gerresheimer Bünde GmbH, Bunde (DE)

( * ) Notice: Subject to any disclaimer, the term of this patent is extended or adjusted under 35 U.S.C. 154(b) by 90 days.

(21) Appl. No.: 17/338,419

(22) Filed: Jun. 3, 2021

(65) Prior Publication Data
US 2021/0380459 A1 Dec. 9, 2021

(51) Int. Cl.
*C03B 23/055* (2006.01)
*C03B 23/045* (2006.01)
*C03B 23/08* (2006.01)

(52) U.S. Cl.
CPC .......... *C03B 23/055* (2013.01); *C03B 23/045* (2013.01); *C03B 23/08* (2013.01)

(58) Field of Classification Search
CPC ..... C03B 23/045; C03B 23/055; C03B 23/11; C03B 23/05; C03B 23/08; C03B 33/085;
(Continued)

(56) References Cited

U.S. PATENT DOCUMENTS

| 613,319 | A | * | 11/1898 | Sanford | C03B 23/095 65/296 |
| 614,935 | A | * | 11/1898 | Conde | C03B 23/095 65/282 |

(Continued)

FOREIGN PATENT DOCUMENTS

| CN | 1138317 A | * | 12/1996 | ........... C03B 23/095 |
| CN | 1951846 A | * | 4/2007 | |

(Continued)

OTHER PUBLICATIONS

European Search Report dated Oct. 11, 2021 in corresponding European Application No. 21177224.

*Primary Examiner* — Galen H Hauth
*Assistant Examiner* — Steven S Lee
(74) *Attorney, Agent, or Firm* — Leydig, Voit & Mayer, Ltd.

(57) ABSTRACT

The invention relates to a method for producing glassware, in particular rotationally symmetrical glassware, such as a glass syringe, a glass carpule, a glass vial or a glass ampule, wherein the method comprises the steps of rotating a glass intermediate, in particular a glass tube, with a receptacle rotational speed about a receptacle rotational axis, rotating at least one forming roller with a roller rotational speed about a roller rotational axis, and displacing the at least one forming roller and the glass intermediate for shaping in a forming roller contact, from which the receptacle rotational axis is spaced in a radial direction about an intermediate radius and from which the roller rotational axis is spaced in a radial direction about a roller radius, wherein the ratio of the roller rotational speed to the receptacle rotational speed during the method is controlled as a function of the ratio of intermediate radius to roller radius.

15 Claims, 9 Drawing Sheets

(58) Field of Classification Search
CPC ..... C03B 23/092; C03B 17/025; B21B 19/04; B21B 2275/06
See application file for complete search history.

(56) References Cited

U.S. PATENT DOCUMENTS

| | | | | |
|---|---|---|---|---|
| 1,914,205 A | * | 6/1933 | Hooper | C03B 23/095 65/282 |
| 1,974,399 A | * | 9/1934 | Hofmann | C03B 23/112 65/282 |
| 2,368,169 A | * | 1/1945 | Smith | C03B 23/055 65/277 |
| 3,227,539 A | * | 1/1966 | Stapel | C03B 23/055 65/109 |
| 3,343,937 A | * | 9/1967 | Lewis | C03B 23/095 65/109 |
| 4,760,724 A | * | 8/1988 | Okazaki | B21B 37/78 72/97 |
| 5,300,134 A | * | 4/1994 | Mannl | C03B 23/112 65/282 |
| 7,536,888 B2 | * | 5/2009 | Yamakawa | B21B 19/04 72/97 |
| 9,139,464 B2 | * | 9/2015 | Bartsch | C03B 23/045 |
| 10,227,252 B2 | * | 3/2019 | Schultz | G01B 11/08 |
| 10,315,946 B2 | * | 6/2019 | Segner | C03B 23/094 |
| 2014/0041413 A1 | * | 2/2014 | Bartsch | C03B 23/055 65/102 |
| 2015/0114043 A1 | * | 4/2015 | Risch | C03B 23/045 65/374.13 |
| 2016/0130170 A1 | * | 5/2016 | Maennl | C03B 21/06 215/40 |
| 2016/0244354 A1 | * | 8/2016 | Segner | C03B 23/095 |
| 2019/0161380 A1 | * | 5/2019 | Gaylo | C03B 23/095 |
| 2019/0161383 A1 | * | 5/2019 | Deneka | C03B 23/099 |
| 2020/0123038 A1 | * | 4/2020 | Jud | C03B 23/055 |
| 2020/0148576 A1 | * | 5/2020 | Otero | C03B 23/049 |

FOREIGN PATENT DOCUMENTS

| | | | | |
|---|---|---|---|---|
| CN | 110615604 A | * | 12/2019 | ........... C03B 23/043 |
| DE | 4028824 C1 | | 3/1992 | |
| DE | 102009031689 A1 | * | 12/2010 | ........... C03B 23/043 |
| DE | 102009031689 A1 | | 12/2010 | |
| DE | 102012025610 A1 | | 2/2014 | |
| DE | 102013109454 A1 | | 3/2015 | |
| EP | 3059213 A1 | | 8/2016 | |
| JP | H05261409 A | * | 10/1993 | ............ B21B 37/78 |
| JP | H07115050 B2 | * | 12/1995 | ............ B21B 19/06 |
| WO | WO-2004057647 A1 | * | 7/2004 | ............ C03B 23/07 |
| WO | WO-2005092805 A1 | * | 10/2005 | ........... C03B 23/095 |
| WO | WO-2013038976 A1 | * | 3/2013 | ........... C03B 23/045 |
| WO | WO-2018099403 A1 | * | 6/2018 | ............ B21B 19/00 |
| WO | WO 2019/108705 | | 6/2019 | |
| WO | WO-2019145389 A1 | * | 8/2019 | ........... C03B 23/045 |

* cited by examiner

METHOD AND SYSTEM FOR PRODUCING GLASSWARE

CROSS-REFERENCE TO RELATED APPLICATIONS

This application claims the benefit of German Application No. 10 2020 114 886.0, filed Jun. 4, 2020, which is hereby incorporated by reference in its entirety.

BACKGROUND OF THE INVENTION

The present invention relates to methods and systems for producing glassware, in particular rotationally symmetrical glassware, such as a glass syringe, a glass carpule, a glass vial or a glass ampule. The invention further relates to a device for forming a rotating glass intermediate, in particular a glass tube, in particular for use in such a system and for such a method.

Glassware, such as glass syringes, glass carpules, glass vials or glass ampules, are subject to very low production tolerances, so that, on the one hand, a high product quality can be ensured and, on the other hand, the partially standardized interfaces can be maintained, for example, in the funnel-shaped end section. In particular, a dimensional accuracy of the final contour of 0.03 mm can be required for a reliable fastening of a plastic component to a piece of glassware. In particular, a dimensional accuracy of the final contour of 0.03 mm can be required for the realization of an automatic assembly of plastic components on items of glassware.

For the production of glassware, it is known to heat glass intermediates to temperatures above the transformation temperature, set them in rotation and to form them into glassware by pressing a forming roller against the glass intermediate surface. The contact formed between the glass intermediate surface and the forming roller can be referred to in particular as forming roller contact. In order to produce glassware, in particular with complex geometries, carrying out forming in a plurality of steps is known. For example, different forming rollers can be used and the glass intermediates can be cooled and/or reheated between the use of the different forming rollers.

DE 10 2009 031 689 A1 describes that the forming in a plurality of steps has a negative effect on the dimensional accuracy of the glassware and therefore proposes the use of forming rollers having a diameter variable in the circumferential direction, in order to be able to form glass intermediate products into glassware in a single step. Thereby, it is proposed to design the forming rollers either freely rotatably, such that they are rotated in the deformation contact by the friction with the glass intermediate, or to be driven via separate motors. When driving the forming rollers via separate motors, it is proposed to rotate the forming rollers more slowly than the glass intermediate, such that each point on the forming rollers in the forming roller contact has multiple contact with the glass intermediate. This is intended to achieve an effect similar to a ceramics process.

However, it has been found that the non-driven embodiment from DE 10 2009 031 689 A1 does not lead to satisfactory dimensional accuracies, in particular not to dimensional accuracies of the final contour of 0.03 mm, and the driven embodiment in particular requires cycle times that are too great, a high lubricant demand, complex system technology and complex process management.

With the non-driven embodiment, in particular, the high relative speed between the forming roller and the glass intermediate at the beginning of the forming seems to adversely affect the dimensional accuracy. Moreover, inertia, wear, and contamination of the freely rotating forming roller impair the shaping. In particular, with the freely rotatable embodiment, the reproducibility of the circumferential speed of the forming roller depends on the state of the forming roller and its mounting. Thus, for example, wear on the forming roller bearing and/or fluctuations in the lubrication can impair the rotational behavior of the forming roller and thus the dimensional accuracy of the glassware. Furthermore, the inertia of the forming roller at the beginning of the forming process leads to high relative speeds between the forming roller and the glass intermediate, which can lead to the twisting of the glass intermediate and thereby to a low dimensional accuracy of the glassware.

With the driven embodiment, cycle times of approximately 5 seconds are required, which impairs the economic efficiency of the generated glassware. It has been found that such cycle times cannot be significantly reduced either, since this leads to an impairment of the dimensional accuracy with the proposed solution with forming rollers having variable diameters. Furthermore, the production of the complex geometry of the forming rollers is costly. Moreover, the contact surface between the forming rollers and the glass intermediate leads to a high demand for lubricant. Furthermore, the process management, in particular the heating of the glass intermediate and the lubrication in the driven embodiment, has proven to be very complex.

BRIEF SUMMARY OF THE INVENTION

It is therefore an object of the present invention to overcome the disadvantages of the known prior art, in particular to provide a method, a device, and a system for producing glassware with a high degree of dimensional accuracy, in particular with a dimensional accuracy of 0.1 mm or 0.03 mm, and/or with short cycle times, in particular with cycle times of a maximum of one second or a maximum of 0.5 seconds.

This object is achieved by the features of the independent claims.

According to a first aspect, the invention relates to a method for producing glassware, in particular rotationally symmetrical glassware, such as a glass syringe, a glass carpule, a glass vial or a glass ampule. The method comprises the steps of rotating a glass intermediate, in particular a glass tube, with a receptacle rotational speed about a receptacle rotational axis, rotating at least one forming roller with a roller rotational speed about a roller rotational axis, and displacing the at least one forming roller and the glass intermediate for shaping in a forming roller contact, from which the receptacle rotational axis is spaced in a radial direction about an intermediate radius and from which the roller rotational axis is spaced in a radial direction about a roller radius. The ratio of the roller rotational speed to the receptacle rotational speed during the method is controlled as a function of the ratio of intermediate radius to roller radius.

The glass intermediate can in particular be rotated about the receptacle rotational axis by a receptacle. The receptacle rotational axis is in particular the axis along which the longitudinal axis of the glass intermediate extends when it is held in the receptacle. The glass intermediate can in particular be held rotatably about the receptacle rotational axis of the receptacle. In particular, the glass intermediate can be held by the receptacle in such a manner that the rotational speed of the receptacle rotational axis corresponds to the rotational speed of the glass intermediate. Rotating is to be understood in particular as meaning that the glass intermediate rotates in the circumferential direction about its longitudinal axis, in particular about the receptacle rotational axis. A glass intermediate is to be understood in particular a glass tube of predetermined length. In particular, the glass intermediate can be in the shape of a hollow cylinder. In particular, the glass intermediate is provided in a preceding step by cutting off the glass intermediate from a glass tube, in particular a glass tube having a length of at least 1 meter, 2 meters, 3 meters or 4 meters. In particular, during the provision of the glass intermediate, its length and/or its wall thickness is determined and forwarded to a controller for carrying out the method. In particular, the length of the glass intermediate can be set as a function of its wall thickness, in order to compensate for variations in the mass of a glass intermediate caused by varying wall thicknesses, in such a manner that the formed glassware has a predetermined, in particular reproducible, length.

In particular, the receptacle rotational axis extends in the horizontal direction or is inclined by less than 30 degrees, 15 degrees, ten degrees, five degrees or one degree relative to the horizontal.

In particular, rotating at least one forming roller comprises rotating two forming rollers. The two forming rollers extend in particular along a respective roller rotational axis. Preferably, the roller rotational axes of the two forming rollers extend parallel to one another or are inclined by less than 30 degrees, 15 degrees, ten degrees, five degrees or one degree relative to one another. In particular, the at least one roller rotational axis extends along the horizontal axis or is inclined by less than 30 degrees, 15 degrees, ten degrees, five degrees or one degree relative to the horizontal. The forming roller can in particular be formed to be rotationally symmetrical.

In particular, the at least one forming roller can have a forming area for the forming roller contact. In particular, the forming area is formed by a roller sleeve extending around the roller rotational axis. The forming area can in particular be formed to be cylindrical and/or conical. As described below, the method for producing rotationally symmetrical glassware can have a plurality of forming steps. In each of the forming steps, at least one forming roller, preferably two forming rollers, having different forming areas can preferably be used in each case. In particular, at least one forming roller with a conical forming area can be used in the first forming step and/or intermediate forming step described below. Alternatively or additionally, at least one forming roller having a cylindrical forming area can be used in the last pre-forming step described below and/or in the final forming step.

The roller rotational axis of the at least one forming roller corresponds in particular to the longitudinal axis of the at least one forming roller. In particular, the at least one forming roller is formed to be rotationally symmetrical about its longitudinal axis.

In particular, the roller rotational axis of the at least one forming roller extends parallel to the receptacle rotational axis and/or is inclined by less than 30 degrees, 15 degrees, ten degrees, five degrees or one degree relative to the receptacle rotational axis.

Shaping is to be understood in particular as the formation of a glass intermediate to form glassware. According to the first aspect of the invention, the forming can consist of a plurality of shaping steps or of a single shaping step. In the preferred embodiment described below and according to additional aspects of the invention, however, shaping takes place in a plurality of forming steps, in particular in four forming steps, in particular with separate forming rollers and receptacles in each case. For shaping, the forming roller is brought into forming roller contact with the glass intermediate. The forming roller contact is to be understood as the contact surface between the forming roller and the glass intermediate. In particular, the forming roller exerts a forming force on the glass intermediate in the forming roller contact. The forming force can act in particular in the radial direction, in order to deform the glass intermediate in the radial direction. Alternatively or additionally, the forming force can act on the glass intermediate in the axial direction. In the forming roller contact, the forming roller rolls in particular over the glass surface of the glass intermediate. In the forming roller contact, in particular, the forming roller rotates about the roller rotational axis. In particular, the glass intermediate rotates in the forming roller contact about a longitudinal axis, in particular a rotational axis, of the glass intermediate and/or about the receptacle rotational axis. In particular, the longitudinal axes of the glass intermediate, in particular the receptacle rotational axis, and the roller rotational axis extend parallel to one another in the forming roller contact.

In particular, the forming roller is adjustable along an infeed axis. In particular, the forming roller can be adjustable along a radial infeed axis. A radial infeed axis is in particular an infeed axis extending in the radial direction, in particular an infeed axis that extends transversely, in particular orthogonally and/or radially, to the roller rotational axis. Alternatively or additionally, the forming roller can be adjustable along an axial infeed axis. An axial infeed axis is in particular an infeed axis extending in the axial direction, in particular an infeed axis that extends longitudinally, in particular parallel, to the roller rotational axis. The translational adjustability along a radial infeed axis serves in particular for shaping the glass intermediate in the radial direction. The translational adjustability of the forming rollers in the axial direction serves in particular to axially feed the forming rollers as a function of the axial position of the region of the glass intermediate to be deformed. The axial position of the region to be deformed can vary in particular as a function of the thickness of the glass intermediate. In particular, in a preceding step, in particular when cutting the glass intermediate, its wall thickness can be determined and the length and/or axial position of the region to be deformed can be determined as a function of the thickness. The thickness, the length and/or the axial position of the region to be deformed can be transmitted, such that the axial position of the forming rollers can be set accordingly. Glassware with a high degree of dimensional accuracy can thereby be produced in particular, even with a variable thickness of the glass intermediate. Such consideration of the variation in thickness of the glass intermediate can be referred to as glass mass compensation.

The method can further comprise a step of translationally moving a forming mandrel into the interior of the glass intermediate, in order to form the glass intermediate on the inside in the forming roller contact, while the at least one forming roller forms the glass intermediate on the outside. The forming mandrel can extend in particular parallel or by less than 30 degrees, 50 degrees, ten degrees, five degrees or one degree relative to the roller rotational axis and/or the receptacle rotational axis. In particular, the forming mandrel can have a forming area turned towards the radial inner side of the glass intermediate. The forming area of the forming mandrel can be formed to be rotationally symmetrical with respect to the longitudinal axis of the mandrel. In particular, the forming area of the forming mandrel can be formed to be conical or cylindrical. In particular, the forming mandrel can be formed in a manner complementary to the forming area of the at least one forming roller in a forming device, in particular a pre-forming device and/or a final forming device. In particular, the forming mandrel is moved radially inside into the glass intermediate before the at least one forming roller and the glass intermediate are brought into forming roller contact.

The glass intermediate and the at least one forming roller can be displaced into forming roller contact in particular by a method of the at least one forming roller and/or of the glass intermediate along an infeed axis. Preferably, the at least one forming roller is displaced into forming roller contact with the glass intermediate by moving the at least one forming roller, in particular two forming rollers, along the infeed axis onto the receptacle rotational axis. The infeed axis preferably extends in the radial direction to the receptacle rotational axis and/or to the roller rotational axis.

In particular, the ratio of roller rotational speed to receptacle rotational speed is controlled during the method by means of a controller, in particular a control unit. Control during the method can be understood to mean control during the displacement of the at least one forming roller and the glass intermediate into forming roller contact, during the reduction of the distance between the roller rotational axis and the receptacle rotational axis in the forming roller contact described below and/or during the release of the forming roller contact. Alternatively or additionally, control during the method can be understood to be a control of the receptacle rotational speed and/or the roller rotational speed over a plurality of forming steps.

By controlling the roller rotational speed and the receptacle rotational speed as a function of the ratio of intermediate radius to roller radius, it can be ensured that a desired relative speed between intermediate and forming roller in the forming roller contact is ensured. A relative speed that is too high can in particular cause low dimensional accuracy, cosmetic defects, increased lubricant consumption and/or increased wear of the forming rollers. Nevertheless, a relative speed can also present advantages, to some extent, such as providing additional forces for shaping the glass intermediate and/or heat introduction in the forming roller contact. Nevertheless, it is particularly necessary to avoid a relative speed that is too high.

As a result of the deformation of the glass intermediate in the radial direction, the intermediate radius in the forming roller contact becomes smaller during the method. With a constant receptacle rotational speed, this leads to a reduced circumferential speed of the surface of the intermediate in the forming roller contact. For example, reductions in the intermediate radius from an initial radius to an end radius by 66 percent may occur, such as, for example, upon a reduction from twelve millimeters to four millimeters. Such a reduction leads, for example, to a reduction of the circumferential speed from the initial radius to the end radius of 66 percent, such as, for example, when the circumferential speed is reduced from 450 millimeters per second to 150 millimeters per second. With a constant roller rotational speed, receptacle rotational speed and roller radius, this can lead to a significant increase in the relative speed in the forming roller contact. With the measure according to the invention, the relative speed can be set in a desired range even with strong deformations of the glass intermediate. In particular, relative speeds that are too high can be avoided.

In one embodiment, the intermediate radius in the forming roller contact is reduced from an initial radius to an end radius by reducing the distance between the roller rotational axis and the receptacle rotational axis. In particular, the roller rotational speed is reduced during the reduction from the initial radius to the end radius. Alternatively or additionally, the ratio of the roller rotational speed to the receptacle rotational speed is reduced during the reduction from the initial radius to the end radius, in particular reduced proportionally to the intermediate radius. Preferably, the receptacle rotational speed remains constant during the reduction from the initial radius to the end radius. Furthermore, the roller radius preferably remains constant during the reduction from the initial radius to the end radius. Accordingly, the reduction of the intermediate radius is preferably compensated by the reduction of the roller rotational speed, in order to keep the relative speed between the glass intermediate and the at least one forming roller in the forming roller contact as constant as possible.

The initial radius is to be understood in particular as the radius of the intermediate at the point in time at which the forming roller comes into contact with the intermediate. Thereby, the initial radius is to be understood as the radius at the axial contact point of the intermediate, with which the forming roller first comes into contact. In particular in the case of conically formed forming rollers, additional contact points between forming roller and intermediate can arise in the radial direction during the further method of the forming roller. However, the initial radius is preferably to be understood as the initial radius at the first contact point. The intermediate radius is reduced during the reduction of the distance between the at least one forming roller and the glass intermediate. The end radius is to be understood in particular as the intermediate radius, which the intermediate has at the axial height of the first contact point, after the distance between the roller rotational axis and the receptacle rotational axis has been reduced to an end distance in one forming step. A forming step can be understood in particular to mean the at least one pre-forming step and/or final forming step described below.

The distance between the roller rotational axis and the receptacle rotational axis is preferably reduced by moving the glass intermediate and the at least one forming roller relative to one another along the infeed axis.

The distance between the roller rotational axis and the receptacle rotational axis can be reduced in particular by at least two millimeters, four millimeters, six millimeters, eight millimeters or ten millimeters in one forming step. In particular, the reduction of the distance between the receptacle rotational axis and the roller rotational axis corresponds to the reduction of the intermediate radius.

The roller rotational speed is preferably reduced during the reduction from the initial radius to the end radius. In particular, the roller rotational speed is reduced proportionally to the intermediate radius. In particular, proportional is understood to mean that a homogeneous linear assignment exists between the intermediate radius and the roller rotational speed with a constant proportionality factor. For example, the homogeneous linear assignment can be such that an intermediate radius of twelve millimeters corresponds to a roller rotational speed of 150 revolutions per minute and an intermediate radius of four millimeters corresponds to a roller rotational speed of 50 revolutions per minute. In this case, the proportionality factor would be 12.5 revolutions per minute per centimeter.

In particular, the roller rotational speed is reduced simultaneously with the roller radius. "Simultaneously" is to be understood to mean, in particular, an adjustment of the roller rotational speed to the intermediate radius in the millisecond cycle. In particular, a millisecond cycle can be understood as a cycle of one millisecond, three milliseconds, five milliseconds, ten milliseconds, 20 milliseconds, 30 milliseconds, 50 milliseconds, 100 milliseconds or 200 milliseconds.

As described above, the roller rotational speed is preferably reduced according to the reduction of the intermediate radius. Alternatively or additionally, the receptacle rotational speed can be set with a decreasing intermediate radius, in order to prevent or mitigate a reduction of the circumferential speed of the glass intermediate in the forming roller contact. In particular, regardless of whether the roller rotational speed is reduced, the receptacle rotational speed is increased, or both are combined with one another, it is important that the ratio of roller rotational speed to receptacle rotational speed is reduced during the reduction from the initial radius to the end radius. In particular, the ratio of roller rotational speed to receptacle rotational speed is reduced proportionally and/or simultaneously with the intermediate radius.

In particular, the roller rotational speed is reduced by at least 20 percent, 40 percent or 60 percent during the reduction from the initial radius to the end radius. Alternatively or additionally, the intermediate radius is reduced from the initial radius to the end radius by at least 20 percent, 40 percent or 60 percent.

In one embodiment, the reduction from the initial radius to the end radius takes place by feeding the at least one forming roller in the radial direction. Alternatively or additionally, the roller rotational speed is set as a function of the radial position of the at least one forming roller. In particular, the at least one forming roller is placed on the intermediate along the infeed axis, in particular in the radial direction to the receptacle rotational axis. In particular, the reduction of the intermediate radius is determined from the feed path of the at least one forming roller in the radial direction. For this purpose, the initial radius of the glass intermediate is determined in particular before the glass intermediate is displaced with the at least one forming roller into forming roller contact. This can be effected in particular by measuring by means of sensor technology or by passing the end radius from a preceding forming step, in which it is determined via the axial position of the forming roller at the end of the progress. Subsequently, taking into account the geometry and/or orientation of the forming roller, the radial position in which the forming roller forms the first contact with the glass intermediate can be determined. It is then possible to determine how far the forming roller is moved towards the receptacle axis beyond this first contact during the forming step. The reduction of the glass intermediate in the forming step can be determined from the difference. Subsequently, taking into account the infeed speed of the forming roller, according to which time units, in particular millisecond cycles, the intermediate radius will be reduced by which amount can be determined. On this basis, the roller rotational speed of the at least one forming roller can be reduced simultaneously and/or proportionally to the intermediate radius in particular in the millisecond cycle.

In one embodiment, the ratio of roller rotational speed to roller radius is controlled as a function of the ratio of intermediate radius to roller radius, in such a manner that the relative speed between the intermediate radius and the at least one forming roller in the forming roller contact is at most 50 percent, 30 percent, 20 percent, ten percent, five percent or one percent of the circumferential speed of the at least one forming roller in the forming roller contact. This can be ensured in particular by the ratio of roller rotational speed to receptacle rotational speed substantially corresponding to the ratio of intermediate radius to roller radius. Essentially, this is to be understood as a deviation of at most 50 percent, 30 percent, 20 percent, ten percent, five percent or one percent of a ratio of one. With a deviation of zero percent, the ratio of roller rotational speed to receptacle rotation speed would be identical to the ratio of intermediate radius to roller radius. In such a set method, in particular, there would be no relative speed between the forming roller and the glass intermediate in the forming roller contact. A deviation of at most 50 percent is intended in particular to mean that the quotient of both ratios can be between 0.5 and 1.5, whereas a deviation of ten percent is intended to mean that the quotient of both ratios can be between 0.9 and 1.1.

In particular, the ratio of roller rotational speed to receptacle rotational speed is controlled simultaneously and/or proportionally to the ratio of intermediate radius to roller radius. In particular, the control can relate to the control of the roller rotational speed and/or the receptacle rotational speed between different forming steps and/or to the control within a forming step by means of which the reduction of the intermediate radius is compensated.

In particular, with the control of the receptacle rotational speed and the roller rotational speed, in addition to the intermediate radius and the roller radius, the wall thickness of the glass intermediate and/or the geometry to be achieved during shaping can also be taken into account. In particular, depending on the wall thickness and the intended geometry, a larger or smaller relative speed can be set. In particular, when the glass intermediate is deformed with a conical forming roller, the receptacle rotational speed and/or the roller rotational speed can be set such that the relative speed between the forming roller and the glass intermediate in the axial middle region of the forming roller is approximately zero and rises in the regions extending in the axial direction from the axial middle region.

A second aspect of the invention relates to a method for producing glassware, in particular rotationally symmetrical glassware, such as a glass syringe, a glass carpule, a glass vial or a glass ampule. The second aspect of the invention can be combined with the first aspect and vice versa. The method comprises the steps of forming at least one glass intermediate, in particular a glass tube, in at least one pre-forming step, in which the at least one glass intermediate is rotated by a pre-forming rotational speed for shaping in a forming roller contact with at least one forming roller, and forming the at least one glass intermediate in a final forming step, in which the at least one glass intermediate is rotated for shaping in a forming roller contact with a forming roller by a final forming rotational speed. The at least one pre-forming step and/or the final forming step may in particular be carried out as described in connection with the first aspect of the invention. The at least one pre-forming step is effected in particular by shaping the glass intermediate with at least one pre-forming device. The final forming step is effected in particular by shaping the glass intermediate with a separate final forming device relative to the at least one pre-forming device. The final forming rotational speed is greater or less than the pre-forming rotational speed. In other words, the pre-forming rotational speed differs from the final forming rotational speed.

In particular, the glass intermediate is rotated about a receptacle rotational axis in the at least one pre-forming step by driving a receptacle holding the glass intermediate. After shaping in the at least one pre-forming step, the receptacle is moved, in particular, to the final forming device, where the shaping takes place in the final forming step.

The inventors of the present invention have found that rotating the glass intermediate at different rotational speeds in different forming steps is advantageous in order to achieve a greatest possible dimensional accuracy, in particular in combination with short cycle times. In particular, the rotational speed of the glass intermediate can be set as a function of the wall thickness of the glass intermediate, the geometry of the glass intermediate to be formed, for example a cylindrical shape or a conical shape, and/or the region of the glass intermediate to be formed. In particular, the final forming rotational speed can differ from the pre-forming rotational speed in the at least one pre-forming step by 200 revolutions per minute to 1000 revolutions per minute, in particular by 400 revolutions per minute to 800 revolutions per minute or 500 revolutions per minute to 700 revolutions per minute.

In one embodiment, the pre-forming rotational speed in the forming roller contact of the at least one pre-forming step is constant. Alternatively or additionally, the final forming rotational speed in the forming roller contact of the final forming step is constant. Alternatively or additionally, the pre-forming rotational speed differs in magnitude by at least ten percent, 20 percent, 30 percent, 50 percent, 100 percent, 200 percent or 300 percent from the final forming rotational speed. Alternatively or additionally, the final forming rotational speed is the same as the pre-forming rotational speed. In particular, the pre-forming rotational speed is 20 percent to 90 percent, in particular 30 percent to 80 percent, of the final forming rotational speed. In particular, the final forming rotational speed can be at least 1200 revolutions per minute, in particular at least 1400 revolutions per minute. Alternatively or additionally, the final forming rotational speed can be at most 2000 revolutions per minute, in particular at most 1700 revolutions per minute. Alternatively or additionally, the pre-forming rotational speed can be at least 300 revolutions per minute, in particular at least 500 revolutions per minute. Alternatively or additionally, the pre-forming rotational speed can be at most 1400 revolutions per minute, in particular at most 1150 revolutions per minute.

In particular in the case of the final forming rotational speed, it has been found to be preferred to use high rotational speeds in order to increase the dimensional accuracy during the shaping of the glassware. In particular, increased heat input into the glass intermediate can be achieved by the high rotational speed. In contrast, in the at least one pre-forming step, in particular in the last pre-forming step described below, it has proven to be advantageous to use smaller rotational speeds in order to prevent spinning of the low-viscosity glass during the pre-forming by centrifugal forces.

In one embodiment, the at least one pre-forming step comprises a first pre-forming step with a first pre-forming rotational speed in the direction of production and a last pre-forming step with a last pre-forming rotational speed in the direction of production. In particular, the first pre-forming rotational speed is greater than the last pre-forming rotational speed. In particular, the first pre-forming rotational speed is ten percent to 30 percent, in particular 15 percent to 20 percent, greater than the last pre-forming rotational speed. Alternatively or additionally, the first pre-forming rotational speed is at least 500 revolutions per minute, in particular at least 600 revolutions per minute. Alternatively or additionally, the first pre-forming rotational speed is at most 900 revolutions per minute, in particular at most 800 revolutions per minute. Alternatively or additionally, the last pre-forming rotational speed is at least 400 revolutions per minute, in particular at least 500 revolutions per minute. Alternatively or additionally, the last pre-forming rotational speed is at most 800 revolutions per minute, in particular at most 700 revolutions per minute.

In particular, a particularly cylindrical glass intermediate is constricted, in particular conically constricted, in a forming region in the first pre-forming step. For this purpose, at least one forming roller and/or a forming mandrel with a conical forming area is preferably used in the first pre-forming step.

In particular, in the last pre-forming step, a conically formed region of the glass intermediate is straightened, in particular formed into a cylindrical region. For this purpose, at least one forming roller and/or a forming mandrel with a cylindrical forming area is preferably used in the last pre-forming step.

In the final forming step, the region of the glass intermediate formed, in particular constricted, in the at least one pre-forming step is preferably formed, in particular straightened, into a cylindrical section. For this purpose, at least one forming roller and/or a forming mandrel having a cylindrical circumferential surface is preferably used.

In one embodiment, the at least one pre-forming step comprises a first pre-forming step with a first pre-forming rotational speed in the direction of production, a last pre-forming step of a last pre-forming rotational speed in the direction of production and an intermediate pre-forming step with an intermediate pre-forming rotational speed in the direction of production. In particular, the first pre-forming rotational speed is less than the intermediate pre-forming rotational speed. In particular, the first pre-forming rotational speed is 40 percent to 90 percent, in particular 60 percent to 70 percent, of the intermediate pre-forming rotational speed. Alternatively or additionally, the last pre-forming rotational speed is less than the intermediate pre-forming rotational speed. In particular, the last pre-forming rotational speed is 30 percent to 80 percent, in particular 50 percent to 60 percent, of the intermediate pre-forming rotational speed.

In particular, the intermediate pre-forming rotational speed is between 800 revolutions per minute and 1300 revolutions per minute, in particular between 1000 revolutions per minute and 1150 revolutions per minute.

In particular, the wall thickness of the glass intermediate is reduced, in particular in the intermediate pre-forming step. In particular, the glass intermediate is thinned in the intermediate pre-forming step. Preferably, the glass intermediate is formed into a conical shape, in particular into a constricted glass intermediate, in the pre-forming step upstream of the intermediate pre-forming step, in particular the first pre-forming step. In the intermediate pre-forming step, the glass intermediate is preferably formed by means of at least one forming roller and/or a forming mandrel with conical forming area. In particular, the glass intermediate is compressed in the radial direction between the forming mandrel and the at least one forming roller in such a manner that the wall thickness of the glass intermediate decreases. Particularly in the pre-forming step downstream of the intermediate pre-forming step, in particular the last pre-forming step, the conical shape of the glass intermediate is at least partially once again formed, in particular straightened, into a cylindrical shape. For this purpose, at least one forming roller and/or a forming mandrel with a cylindrical forming area is preferably used in the last pre-forming step.

Particularly preferably, the at least one pre-forming step comprises exactly three pre-forming steps, specifically firstly the first pre-forming step in the direction of production, then the intermediate pre-forming step and then the last pre-forming step.

In one embodiment, the at least one pre-forming step is carried out in at least one pre-forming device and the final forming step is carried out in a final forming device. In particular, the at least one glass intermediate is moved to the final forming device after the at least one pre-forming step. In particular, the at least one glass intermediate is moved by means of a feed device, in particular by rotating a carousel. In particular, the pre-forming device and/or the final forming device are each a device for forming a rotating glass intermediate, in particular as described below in connection with the fourth aspect of the present invention.

In particular, the at least one glass intermediate is rotatably held in at least one receptacle, via which the at least one glass intermediate is rotated with a receptacle rotational speed about a receptacle rotational axis. In particular, the pre-forming rotational speed in the at least one pre-forming step and the final forming rotational speed in the final forming step are set via the receptacle rotational speed of the receptacle. In particular, the at least one glass intermediate is moved to at least one pre-forming device before the at least one pre-forming step. There, in particular the receptacle rotational speed is set to the pre-forming rotational speed. In particular, the shaping is carried out by displacing the at least one glass intermediate into forming roller contact with at least one forming roller of a pre-forming device, as described above. In particular, the forming roller contact is released again. Alternatively, the at least one glass intermediate can be moved to the final forming device. In the final forming device, the receptacle rotational speed can be set to the final forming rotational speed. In particular, the formation is carried out by displacing the at least one glass intermediate into forming roller contact with at least one forming roller of a final forming device, as described above. In embodiments in which the at least one pre-forming step has at least two or three pre-forming steps, the receptacle can in each case be moved after a pre-forming step has taken place in a pre-forming device to a pre-forming device downstream in the direction of production for carrying out the downstream pre-forming step.

The at least one pre-forming device and the final forming device are preferably arranged circumferentially about a carousel axis of the carousel, in order to be able to move the at least one glass intermediate from the at least one pre-forming device to the final forming device by rotating the receptacle carousel about the carousel axis.

The device described above and below for forming a rotating glass intermediate can also be referred to as a pre-forming device, a final forming device and/or a shaping device. Upstream and/or downstream in the direction of production of the at least one shaping device, at least one heating device, in particular at least one burner, can be provided for heating the glass intermediate. In particular, at least one heating device can be provided in each case between two shaping devices and/or at least one heating device can be provided in each case before and/or after a shaping device.

Upstream in the direction of production of the at least one shaping device, in particular the first pre-forming device, a test device can be provided to measure the position and the axial run-out of the glass intermediate in the receptacle.

Downstream in the direction of production of the at least one shaping device, in particular the final forming device, and in particular a downstream heating device, a cooling device can be provided for cooling the glassware or the glass intermediate after shaping has been completed.

Downstream in the direction of production of the at least one shaping device, in particular the final forming device and/or in particular the cooling device, a test device can be provided for testing the geometry of the formed glassware or glass intermediate. Downstream in the direction of production of the test device, an additional cooling device can be provided, followed by an additional test device for detecting scratches and/or cracks in the glassware. Downstream in the direction of production of the test device, an additional cooling device can be provided for detecting scratches and/or cracks. Downstream in the direction of production of this cooling device in particular, a transfer device can be provided for transferring the glassware for further processing. The transfer device can in particular have means for collecting items of glassware ejected from the receptacle and/or for transporting the items of glassware to additional processing devices.

In particular, one or more of the devices described above can be circumferentially arranged about the carousel axis of the receptacle carousel, in order to move the at least one intermediate glass by rotating the carousel between the individual devices.

In one embodiment, the at least one glass intermediate comprises at least two, in particular at least 4, 8, 16 or 32, glass intermediates. In particular, the at least two glass intermediates are formed in parallel, in particular simultaneously, on the at least one pre-forming device and on the final forming device. The at least one glass intermediate preferably comprises at least three or four glass intermediates, each of which is formed in parallel on the at least two or three pre-forming devices and the final forming device. The at least one glass intermediate can preferably have additional, in particular 8, 16 or 32, glass intermediates. In particular, the glass intermediates that are not formed in a shaping device can be processed in parallel on one or more of the additional production devices described above. In particular, all production steps from the measurement of the axial run-out of the glass intermediate, through its forming, to ejection or transfer, can be run off by moving the glass intermediate between the individual devices. In particular by using a plurality of receptacles, by means of which a glass intermediate is held in each case, a plurality of glass intermediates can be formed parallel to an item of glassware. This makes it possible, in particular, to ensure that, despite the plurality of required processing steps, a glass intermediate can be provided in each case within the cycle time of a processing step by the parallel processing of a plurality of glass intermediate.

In one embodiment, the at least one forming roller is rotated in the forming roller contact in the at least one pre-forming step and in the final forming step at a roller rotational speed that is controlled as a function of the intermediate rotational speed and/or the intermediate radius. In particular, the roller rotational speed can be increased when the intermediate rotational speed is increased and/or decreased when the intermediate radius is reduced. In particular, the roller rotational speed is controlled in the at least one pre-forming step and/or the final forming step in such a manner that the ratio of the circumferential speed of the at least one forming roller and the glass intermediate in the forming roller contact differs by less than 50 percent, 30 percent, 20 percent, ten percent, five percent or one percent between the at least one pre-forming step and the final forming step. In particular, the roller rotational speed can also be controlled between the at least two or three pre-forming steps described above. This makes it possible, in particular, to ensure that the relative speed between the at least one forming roller and the glass intermediate remains within a predetermined range both from forming step to forming step and also during one forming step.

In one embodiment, the at least one forming roller is rotated at a roller rotational speed in the at least one pre-forming step and in the final forming step, wherein the roller rotational speed in the at least one pre-forming step differs from the roller rotational speed in the final forming step, in particular is greater or less than the roller rotational speed in the final forming step. In particular, the roller rotational speed in the at least one pre-forming step and the final forming step is controlled as a function of the respective rotational speed of the glass intermediate, in such a manner that the ratio of the circumferential speed of the at least one forming roller and the glass intermediate in the forming roller contact differ by less than 50 percent, 30 percent, 20 percent, ten percent, five percent or one percent between the at least one pre-forming step and the final forming step.

A third aspect of the invention relates to a method for producing glassware, in particular rotationally symmetrical glassware, such as a glass syringe, a glass carpule, a glass vial or a glass ampule. The method according to the third aspect can be combined with the method according to the first and/or second aspect and vice versa. The method comprises the steps of rotating a glass intermediate, in particular a glass tube, with a receptacle rotational speed about a receptacle rotational axis, rotating at least one forming roller at a roller rotational speed about a roller rotational axis, and displacing the at least one forming roller and the glass intermediate for shaping into a forming roller contact. In particular, such steps may be carried out as described in connection with the first and second aspects of the present invention. The receptacle rotational speed and/or the roller rotational speed is controlled via a servomotor during the method. In particular, control via a servomotor allows the receptacle rotational speed and/or the roller rotational speed to be controlled in the millisecond cycle. This means that, in particular, the roller rotational speed and/or the receptacle rotational speed can be adjusted quickly enough during a forming step, even with short cycle times of 0.5 seconds or of one second, in order to avoid relative speeds that are too high between the glass intermediate and the at least one forming roller.

The roller rotational speed of the at least one forming roller is preferably controlled via the servomotor. Preferably, the roller rotational speed of the at least one forming roller is controlled in the millisecond cycle, in particular in a cycle of one millisecond, three milliseconds, five milliseconds, ten milliseconds, 20 milliseconds, 30 milliseconds, 50 milliseconds, 100 milliseconds, 200 milliseconds or 300 milliseconds. More preferably, the method comprises rotating at least two forming rollers in a forming device. Each of the forming rollers is preferably controlled by its own servomotor.

Preferably, each of the shaping devices described hereinafter each has its own servomotor per forming roller, in order to be able to change the rotational speed of each forming roller independently of one another in the millisecond cycle.

A fourth aspect of the invention relates to a device for forming a rotating glass intermediate, in particular a glass tube. The device comprises at least one forming roller rotatable about a roller rotational axis for shaping in a forming roller contact with the glass intermediate. The device further comprises at least one roller motor for rotating the at least one forming roller about the roller rotational axis. The at least one roller motor is a servomotor. The device can be referred to in particular as a shaping device. In particular, the pre-forming devices and final forming devices described above and below may be formed according to the device according to the fourth aspect of the invention. The at least one forming roller preferably comprises two forming rollers and the at least one roller motor comprises at least two roller motors. Both roller motors are preferably servomotors. Preferably, a respective roller motor is coupled to a respective forming roller, in order to be able to drive the two forming rollers independently of one another. The at least one roller motor is preferably connected firmly to the at least one forming roller, in such a manner that the roller motor and the forming roller can be adjusted together in the radial direction onto the glass intermediate, in particular can be adjusted along an infeed axis.

The device according to the fourth aspect of the invention can be configured to carry out the methods according to the first, second and/or third aspect of the present invention. Furthermore, the methods according to the first, second and/or third aspect of the invention can be designed in such a manner that they can be carried out with a device according to the fourth aspect of the invention. In particular, the at least one pre-forming step and/or the final forming step according to the second aspect of the invention can be carried out with a device according to the fourth aspect of the invention, in particular with a separate device according to the fourth aspect of the invention.

In one embodiment, the motor output shaft of the at least one roller motor is coupled to the at least one forming roller in such a manner the at least one forming roller directly follows rotational movement of the motor output shaft. In particular, the motor output shaft is connected to the at least one forming roller in a gear-free manner. In this connection, gear-free is to be understood in particular to mean that there is no change in the rotational speed, the torque or the rotational direction between the motor output shaft and the forming roller. However, means of transmission such as a claw coupling may be provided between the motor output shaft and the forming roller.

In one embodiment, the at least one forming roller has two forming rollers and the at least one roller motor has two roller motors, wherein a respective roller motor is coupled to a respective forming roller, in order to drive the forming rollers independently of one another.

A fifth aspect of the invention relates to a system for producing glassware, in particular rotationally symmetrical glassware, such as a glass syringe, a glass carpule, a glass vial or a glass ampule. The system comprises at least one receptacle for rotatably holding a glass intermediate, in particular a glass tube, at least one device having at least one forming roller, which can be rotated about a roller rotational axis for shaping in a forming roller contact with the glass intermediate and having at least one roller motor for rotating the at least one forming roller about the roller rotational axis. The at least one roller motor and/or the at least one receptacle motor is a servomotor.

In particular, the device can be a device according to the fourth aspect of the invention. In particular, the system for producing glassware can be designed with the method according to the first aspect, the second aspect and/or the third aspect of the invention. In particular, the method according to the first aspect, the second aspect and/or the third aspect of the invention can be carried out in such a manner that it can be carried out with the system according to the fifth aspect of the invention.

A sixth aspect of the invention relates to a system for producing rotationally symmetrical glassware such as a glass syringe, a glass carpule, a glass vial or a glass ampule. The system comprises at least one receptacle for rotatably holding a glass intermediate, in particular a glass tube, at least one pre-forming device having at least one forming roller for shaping in a forming roller contact with the glass intermediate, a final forming device having at least one forming roller for shaping in a forming roller contact with the glass intermediate, and a feed device for moving the at least one receptacle from the at least one pre-forming device to the final forming device.

The system according to the sixth aspect of the invention can be embodied in particular in the form of a system according to the fifth aspect of the invention and vice versa. In particular, the final forming device and/or the at least one pre-forming device can be embodied in the form of the device according to the fourth aspect of the invention. The system according to the sixth aspect of the invention can be designed to carry out the method according to the first, second and/or third aspect of the invention. Furthermore, the method according to the first, second and/or third aspect of the invention can be carried out in such a manner that it can be carried out with the device according to the sixth aspect of the invention.

The at least one forming roller of the at least one pre-forming device and/or the final forming device can comprise at least two forming rollers. In particular, a separate roller motor can be provided for each of the forming rollers, in order to be able to drive the forming rollers independently of one another.

In one embodiment, the feed device is a carousel around whose carousel axis the at least one pre-forming device and the final forming device are arranged, in order to move the at least one receptacle from the at least one pre-forming device to the final forming device by rotating the carousel. In particular, the at least one pre-forming device can have at least two or three pre-forming devices, in particular the pre-forming devices described above. In particular, the at least two or three pre-forming devices are arranged around the carousel axis. Alternatively or additionally, additional production devices, such as the heating device, test device, cooling device and/or transfer device described above, can be arranged around the carousel axis.

In one embodiment, the at least one receptacle has at least two, in particular at least 4, 8, 16 or 32, receptacles, in order to form at least two glass intermediates in parallel, in particular simultaneously, on the at least one pre-forming device and on the final forming device. The at least one pre-forming device preferably has at least one first and one last pre-forming device in the direction of production and the at least one receptacle has at least three receptacles, in order to form at least three glass intermediates parallel to the at least two pre-forming devices and to the final forming device. The at least one pre-forming device particularly preferably has at least one first, one intermediate and one last pre-forming device and the at least one receptacle has at least four receptacles, in order to form at least four glass intermediates in parallel, in particular simultaneously, on the at least three pre-forming devices and on the final forming device.

The final forming device and/or the at least one, two or three pre-forming devices are particularly preferably configured in such a manner that the previously described methods can be carried out on the system. Particularly preferably, a separate receptacle is provided for each processing device, in particular for the at least one pre-forming device, the final forming device, the at least one heating device, the at least one cooling device, the at least one test device and/or the transfer device, in order to be able to process glass intermediates simultaneously on each of the devices. In particular, the cycle time for producing the glass intermediate can thereby be reduced, in particular reduced to the cycle time of a single production step, such as a pre-forming step or a final forming step.

In one embodiment, the at least one receptacle has at least two, in particular at least 4, 8, 16 or 32, receptacles, each of which is coupled to a separate receptacle motor, in order to drive the receptacles independently of one another. This makes it possible, in particular, to ensure that a plurality of glass intermediates can be driven parallel to the at least one pre-forming device and the final forming device with different intermediate rotational speeds. As a result, on the one hand cycle times can be reduced and on the other hand the dimensional accuracy can be increased by adjusting the intermediate rotational speed to the optimal intermediate rotational speed for the individual forming steps.

In particular, the described measures according to the invention makes it possible to produce glassware with a dimensional accuracy of 0.03 mm in conjunction with cycle times of less than 0.5 years.

Preferred developments are included in the dependent claims.

BRIEF DESCRIPTION OF THE DRAWINGS

Other properties, features and advantages of the invention become apparent below from the description of preferred embodiments of the invention with reference to the accompanying exemplary drawings, which show.

DETAILED DESCRIPTION OF THE INVENTION

Figure 2:
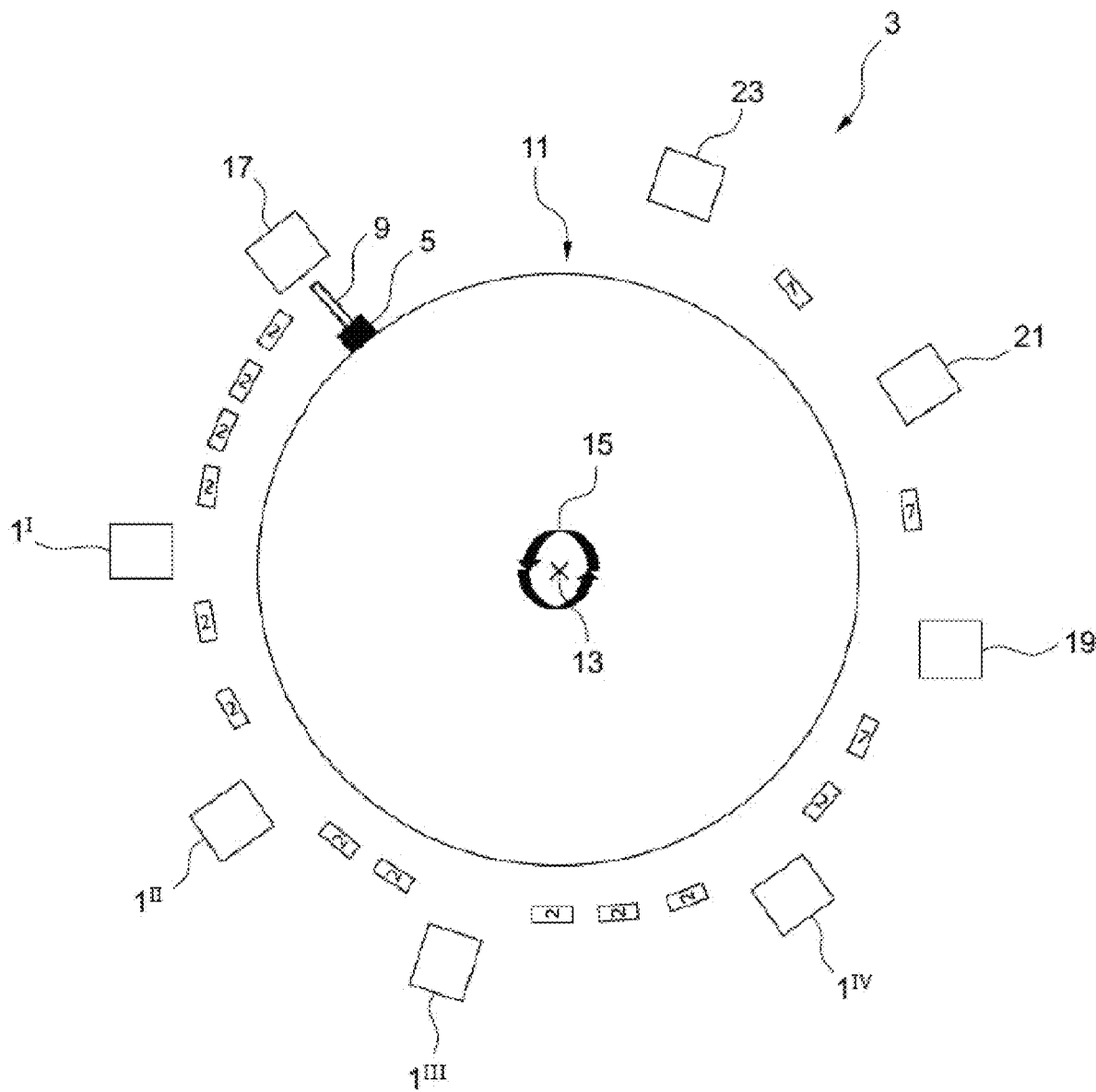
FIG. 2 a schematic illustration of a system for producing glassware.

FIG. 2 shows a schematic illustration of a system 3 for producing an item of glassware, in which four devices $1^I$, $1^{II}$, $1^{III}$, $1^{IV}$ for forming a rotating glass intermediate $1^I$, $1^{II}$, $1^{III}$, $1^{IV}$ are depicted schematically. Such devices $1^I$, $1^{II}$, $1^{III}$, $1^{IV}$ are hereinafter also referred to as a shaping device, a pre-forming device or a final forming device. FIG. 2 schematically shows a receptacle 5 for rotatably holding a glass intermediate 9. The system 3 comprises a carousel 11 to which the receptacle 5 is attached. The carousel 11 is rotatable about the carousel axis 13, whereby the receptacle 9 together with the glass intermediate 9 can be fed to the four illustrated shaping devices $1^I$, $1^{II}$, $1^{III}$, $1^{IV}$. Thereby, the glass intermediate is fed sequentially to the individual shaping devices $1^I$, $1^{II}$, $1^{III}$, $1^{IV}$ in the circumferential direction of production 15. In front of the first shaping device $1^I$ and between the subsequent shaping devices $1^{II}$, $1^{III}$ and behind the last shaping device $1^{IV}$, heating devices 2, in particular burners 2, for heating the glass intermediate 9 are arranged in each case.

A first test device 17 is provided in the circumferential direction of production 15 upstream in the direction of production of the first shaping device $1^I$, in order to measure the position and the axial run-out of the glass intermediate 9 in the receptacle 5.

In the circumferential direction of production 15 downstream in the direction of production of the last shaping device $1^{IV}$ and the last burner 2, a first cooling device 7 for cooling the glassware after shaping has taken place is to be put into effect.

In the circumferential direction of production 15 downstream in the direction of production of the last shaping device $1^{IV}$ and the first cooling device 2, a second test device 19 for testing the geometry of the glass is provided. In the circumferential direction of production 15 downstream in the direction of production of the second test device 19, a second cooling device 7 and subsequently a third test device 21 for detecting scratches and/or jumps in the glassware are provided. In the circumferential direction of production 15 downstream in the direction of production of the third test device 21, a third cooling device 7 is provided. In the circumferential direction of production 15 downstream in the direction of production of the third cooling device 7, a transfer device 23 for transferring the glassware for further processing is provided. The transfer device 23 can in particular have means for collecting items of glassware ejected from the receptacle 5 and/or for transporting the items of glassware to additional processing devices (not shown) such as flange forming devices.

Figure 1:
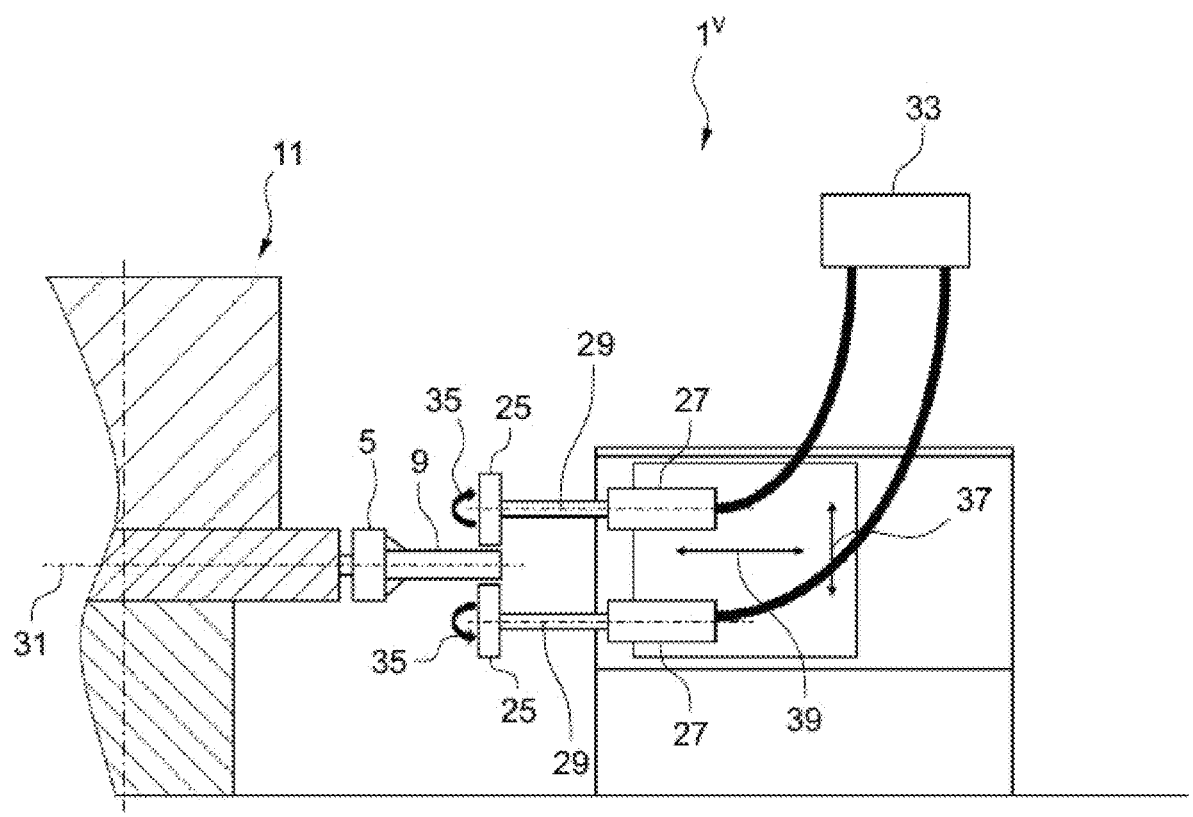
FIG. 1 a schematic partial illustration of a system for producing glassware according to FIG. 2.

FIG. 1 shows a schematic partial illustration of a system according to FIG. 2, in which a cutout of the carousel 11 with a receptacle 5 holding a glass intermediate 9 and one of the shaping devices $1^I$, $1^{II}$, $1^{III}$, $1^{IV}$ is schematically illustrated as a shaping device $1^V$.

The receptacle 5 and the glass intermediate 9 can be rotated about a receptacle rotational axis 31 via a receptacle motor (not shown).

The shaping device $1^V$ comprises two forming rollers 25, each of which can be rotated about a roller rotational axis 29 via a roller motor 27. The roller motors 27 are controlled via a common controller 33, in order to control the rotational speed of the forming rollers 25 in the circumferential direction 35 about the roller rotational axis 29. The translational adjustability of the forming rollers 25 is illustrated by the two arrows. The vertically oriented arrow represents the translational adjustability of the forming rollers 25 transversely to the roller rotational axes 29 and to the receptacle rotational axis 31, in particular in the radial direction 37. The horizontally oriented arrow 39 represents the translational adjustability of the forming rollers 25 along the roller rotational axes 29 and the rotational axis 31, in particular in the axial direction 39.

The depicted position of the forming rollers 25 relative to the glass intermediate 9 represents a position in which the forming rollers 25 are just in front of the forming roller contact with the glass intermediate 9. In order to displace the forming rollers 25 into forming roller contact with the glass intermediate 9, the forming rollers 25 must still be adjusted in the radial direction 39 at least to such an extent that the gap existing between the forming rollers 25 and the glass intermediate 9 is bridged.

The translational adjustability of the forming rollers 25 in the radial direction 37 serves in particular for shaping the glass intermediate 9 in the radial direction 37. The translational adjustability of the forming rollers 25 in the axial direction 39 serves in particular to axially feed the forming rollers 25 as a function of the axial position of the region of the glass intermediate 9 to be deformed. The axial position and the length in the axial direction of the region to be deformed can vary in particular as a function of the thickness of the glass intermediate 9. In particular, in a preceding step, in particular when cutting the glass intermediate 9, its thickness can be determined and the length and/or axial position of the region to be deformed can be determined as a function of the thickness. Subsequently, the thickness, the length and/or the axial position of the region to be deformed can be transmitted to the device $1^V$, such that the axial position of the forming rollers 5 can be set accordingly. Thus, in particular even with a variable thickness of the glass intermediate 9, glassware with a high degree of dimensional accuracy can be produced. Such consideration of the variation in thickness of the glass intermediate can be referred to as glass mass compensation.

The glass intermediate 9 can be rotated about the receptacle rotational axis 31 with a receptacle rotational speed via the receptacle 5. A forming roller 25 with a roller rotation speed can be rotated about the respective roller rotational axis 29 via the roller motors 27. By moving the forming rollers 25 along the radial direction 37 towards the receptacle rotational axis 31, the forming rollers 25 can be displaced into forming roller contact with the glass intermediate 9. The receptacle rotational axis is spaced from the forming roller contact in the radial direction 37 via an intermediate radius. The roller rotational axis 29 is spaced in the radial direction 37 by a roller radius from the forming roller contact.

According to the first aspect of the invention, the ratio of the roller rotational speed to the receptacle rotational speed is controlled during the method as a function of the ratio of intermediate radius and roller radius. In a preferred embodiment, the roller radius does not change during a forming step. However, the intermediate radius is reduced to the receptacle rotational axis 31 by feeding the forming rollers 25 in the roller direction 37. In order to prevent the reduction of the intermediate radius from leading to a reduction of the relative speed between the glass intermediate 9 and the forming rollers 25, either the roller rotational speed can be reduced or the receptacle rotational speed can be increased. The roller rotational speed is preferably reduced. In order to provide a continuous adjustment of the roller rotational speed and/or the receptacle rotational speed during the reduction of the intermediate radius even at high cycle times, in particular cycle times of 0.5 second or 1 second, the roller rotational speed of the forming rollers 25 is controlled in particular as described in connection with the third aspect, fourth aspect, and fifth aspect of the present invention via a servomotor 27 in the millisecond cycle. An exemplary connection of the servomotor 27 to the forming rollers 25 in a shaping device 1 is illustrated in particular in FIGS. 3 to 5. According to the second and sixth aspect of the present invention, the forming of the glass intermediate to form an item of glassware takes place in at least one pre-forming step and at least one final forming step. The at least one pre-forming step and the final forming step can each be carried out with shaping devices as depicted in the FIGS. 3 to 6, for example. FIG. 2 schematically illustrates a system according to the sixth aspect of the invention, comprising a first pre-forming device $1^I$, an intermediate pre-forming device $1^{II}$ and a last pre-forming device $1^{III}$. The final forming device is illustrated with reference sign $1^{IV}$. In order to be able to move the glass intermediate 9 between the three pre-forming devices $1^{I}$, $1^{II}$, $1^{III}$ and the final forming device $1^{IV}$, the receptacle 5 can be moved between the pre-forming devices and the final forming device via a feed device 11 in the form of a carousel 11. For this purpose, the pre-forming devices $1^{I}$, $1^{II}$, $1^{III}$ and the final forming device $1^{IV}$ are arranged around the carousel 11. An embodiment of a carousel 11 is illustrated in top view in FIG. 6, in sectional view in FIG. 7 and in partial sectional view in FIG. 8.

Figure 13:
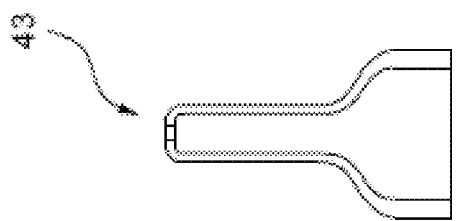
FIG. 13 a glass cone.
Figure 12:
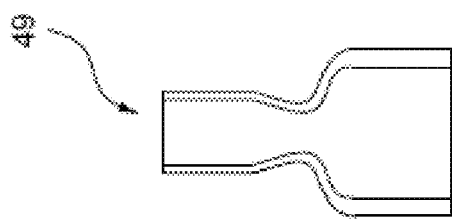
FIG. 12 a straightened glass intermediate.
Figure 11:
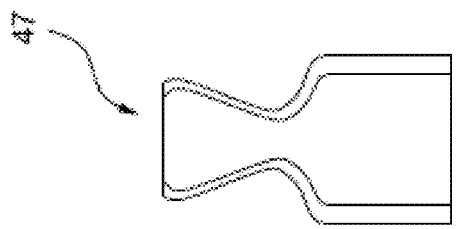
FIG. 11 a thinned glass intermediate.
Figure 10:
FIG. 10 a constricted glass intermediate.
Figure 9:
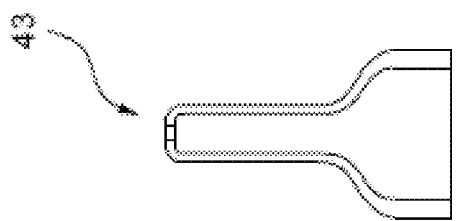
FIG. 9 a hollow cylindrical glass intermediate.

By using at least one, in particular three, pre-forming devices $1^{I}$, $1^{II}$, $1^{III}$ and one final forming device $1^{IV}$, the glass intermediate 9 can be formed in a plurality of steps by a hollow cylindrical glass intermediate 41, as illustrated in FIG. 9, to form a glass cone 43, as illustrated in FIG. 13. In particular, by using three pre-forming steps, the glass intermediate can be formed in steps from the hollow cylindrical glass intermediate 41 to the glass cone 43 as illustrated in FIGS. 10, 11 and 12. FIG. 10 shows a constricted glass intermediate 45 after a first pre-forming step. In particular, the region of the glass intermediate to be deformed was formed into a cone shape. FIG. 11 shows a thinned glass intermediate 47, which is formed by thinning the constricted glass intermediate 45 according to FIG. 10. FIG. 12 shows a straightened glass intermediate 49 that, after constriction in a first pre-forming step and thinning in an intermediate pre-forming step, was again displaced into a hollow cylindrical shape in the last pre-forming step. Subsequently, the glass cone 43, as illustrated in FIG. 13, can be produced by a final forming step in a final forming device $1^{IV}$.

The inventors of the present invention have found that by dividing the forming from the hollow cylindrical glass intermediate 41 according to FIG. 9 to the glass cone 43 according to FIG. 13 into a plurality of forming steps, the optimum conditions for the deformations in the individual forming steps can be set, such that a high degree of dimensional accuracy can be achieved. In particular, the roller rotational speed and/or the receptacle rotational speed can be set low, where this is required for a high degree of dimensional accuracy, and set high, where this is possible without any losses of the dimensional accuracy, in order to be able to reduce the cycle times. In order to further reduce the cycle times, it has been found to be advantageous to attach a plurality of receptacles 5 to a carousel 11, such that the individual forming steps and/or the other production steps described above and below can be carried out in parallel, and thus the cycle time for producing the glassware can be further reduced. An embodiment of a receptacle carousel 11 is illustrated in particular in top view in FIG. 6, in cross-sectional view in FIG. 7 and in cutouts in cross-sectional view in FIG. 8.

Figure 3:
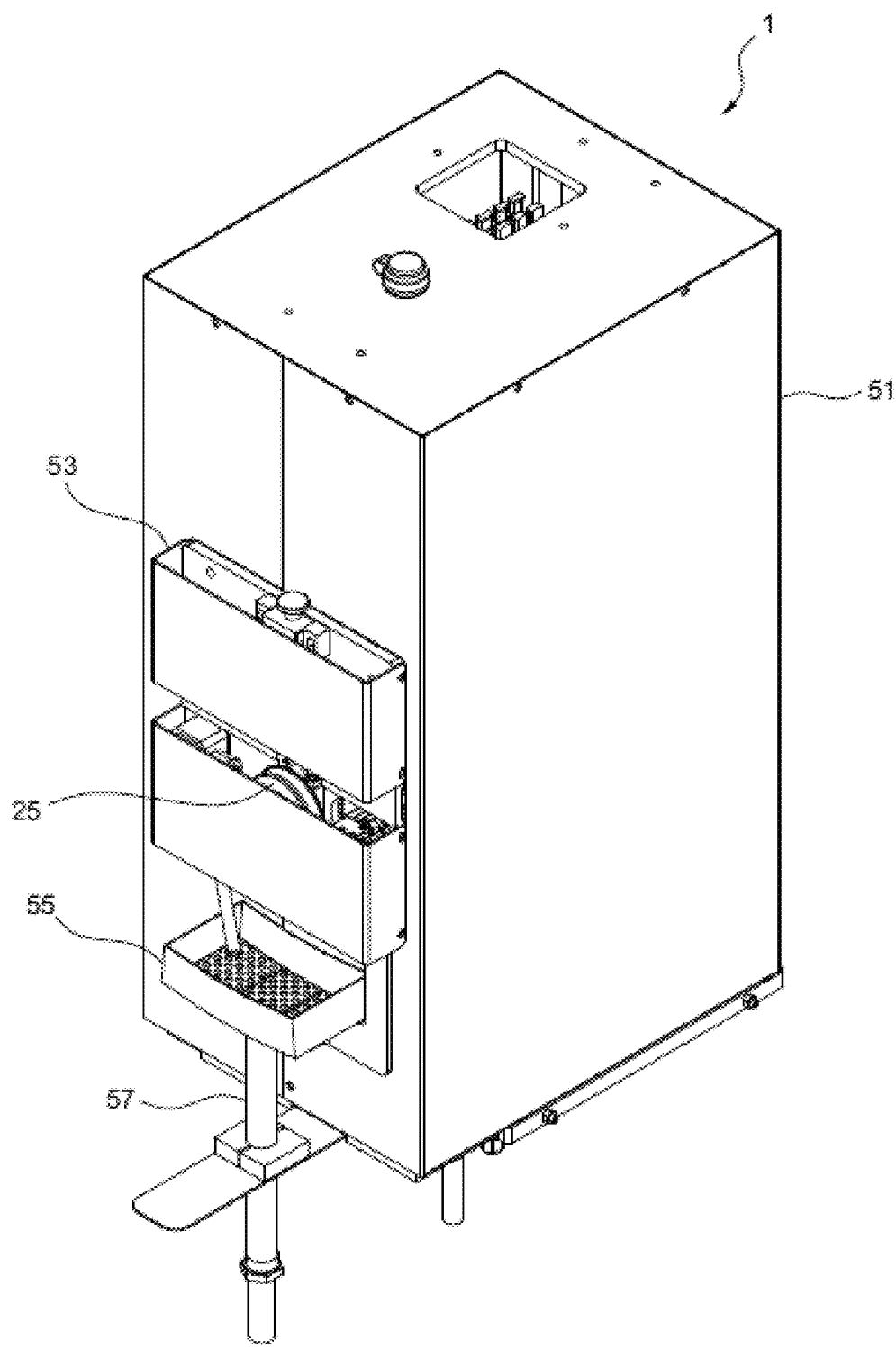
FIG. 3 a shaping device having a housing.
Figure 4:
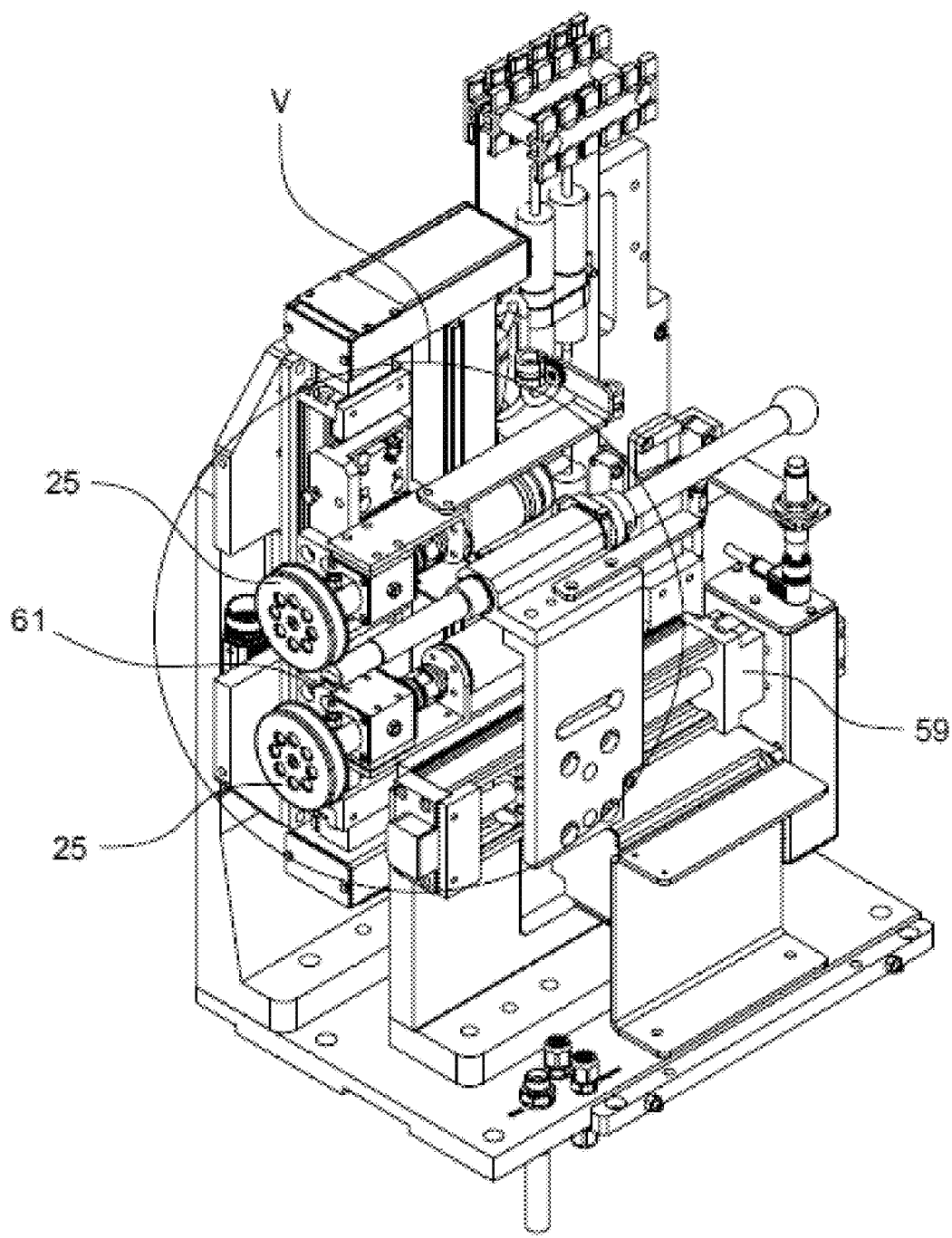
FIG. 4 a part of the shaping device from FIG. 3 without a housing.
Figure 5:
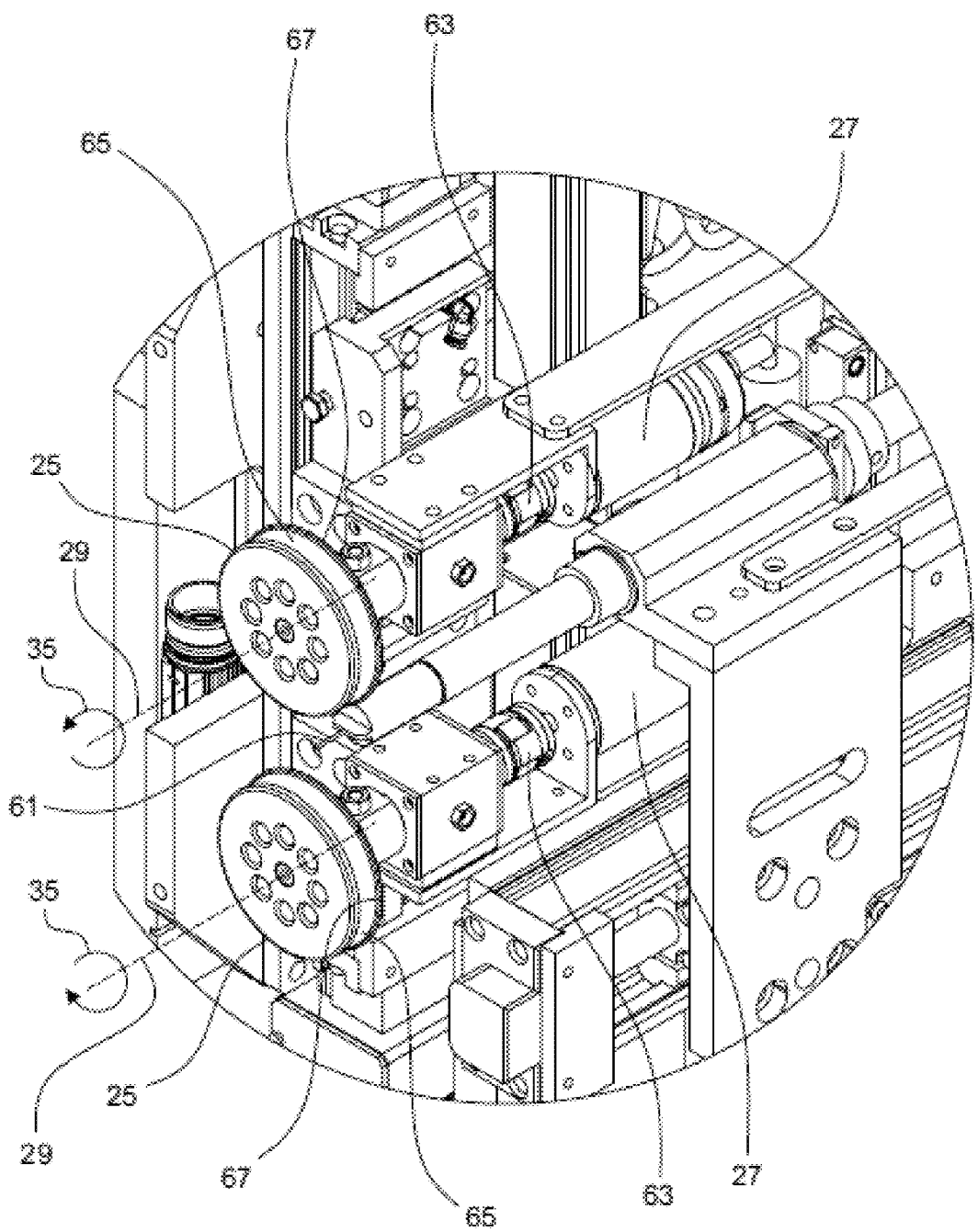
FIG. 5 an enlarged view of cutout V from FIG. 4.

FIG. 3 shows a shaping device with a housing 51, which surrounds the parts of the shaping device 1 illustrated in FIGS. 4 and 5. Two forming rollers 25 protrude out of the housing 51 and are in turn surrounded by forming roller housings 53. The forming roller housings 53 are open in the radial direction 37, such that the forming rollers 25 can protrude radially out of the forming roller housings 53. As a result, the glass intermediate 9 (not shown) can be moved in the axial direction 39 between the forming rollers 25. The forming rollers 25 can be adjusted to the receptacle rotational axis 31 in the radial direction 37. A collecting basin 55 is formed below the forming rollers 25, via which lubricant and dirt along with wear residues can be discharged via a discharge line 57.

FIG. 4 shows a part of the shaping device 1 without the housing 51 and without the forming roller housings 53, wherein the drives for adjusting the forming rollers 25 are concealed in the axial direction 39 and in the radial direction 37. FIG. 4 illustrates an axial guide 59 for guiding the forming mandrel 61 illustrated therein. Thereby, the forming mandrel 61 can be moved in the axial direction 39 via an axial drive (not shown). Thereby, the forming mandrel can be moved into the interior of a glass intermediate 9, in order to form the glass intermediate 9 in the forming roller contact from the inside, while the forming rollers 25 form the glass intermediate 9 from the outside. The roller motors 27, by means of which the two forming rollers 25 can be driven in the circumferential direction 35 about the roller rotational axis 29, are described in connection with FIG. 5, which illustrates an enlarged view of the circled section V from FIG. 4. As illustrated in FIG. 5, the at least one forming roller 25 preferably comprises two forming rollers 25 that are spaced apart in the radial direction 37, such that the glass intermediate 9 can be formed between the forming rollers 25. Thereby, the forming mandrel 61 can be moved into the interior of the glass intermediate 9, in order to form the glass intermediate in the forming roller contact on the inside through the forming mandrel and on the outside through the forming rollers. Each of the forming rollers 25 is driven by a roller motor 27. The motor output shaft of the roller motors 27 is coupled in each case to the forming rollers 25 via a claw coupling 23. In particular, the motor output shaft of the roller motors 27 is coupled to the forming rollers 25 via the claw coupling 23, in such a manner that the forming rollers directly follow the rotational movement of the motor output shaft.

By each of the forming rollers 25 having its own roller motor 27, each of the forming rollers can be driven independently of the other. As described above, the roller motors 27 are embodied as servomotors, in order to be able to set the roller rotational speed in the millisecond cycle. Each of the forming rollers 25 has a forming area 65. In the embodiment illustrated here, the forming areas 65 are embodied as cylinder jacket surfaces with an annular projection 67. The forming mandrel 61 is embodied here as a cylinder. However, as described above, both the forming areas of the forming rollers 25 and the forming mandrel 61 can be formed as a cone surface.

Figure 6:
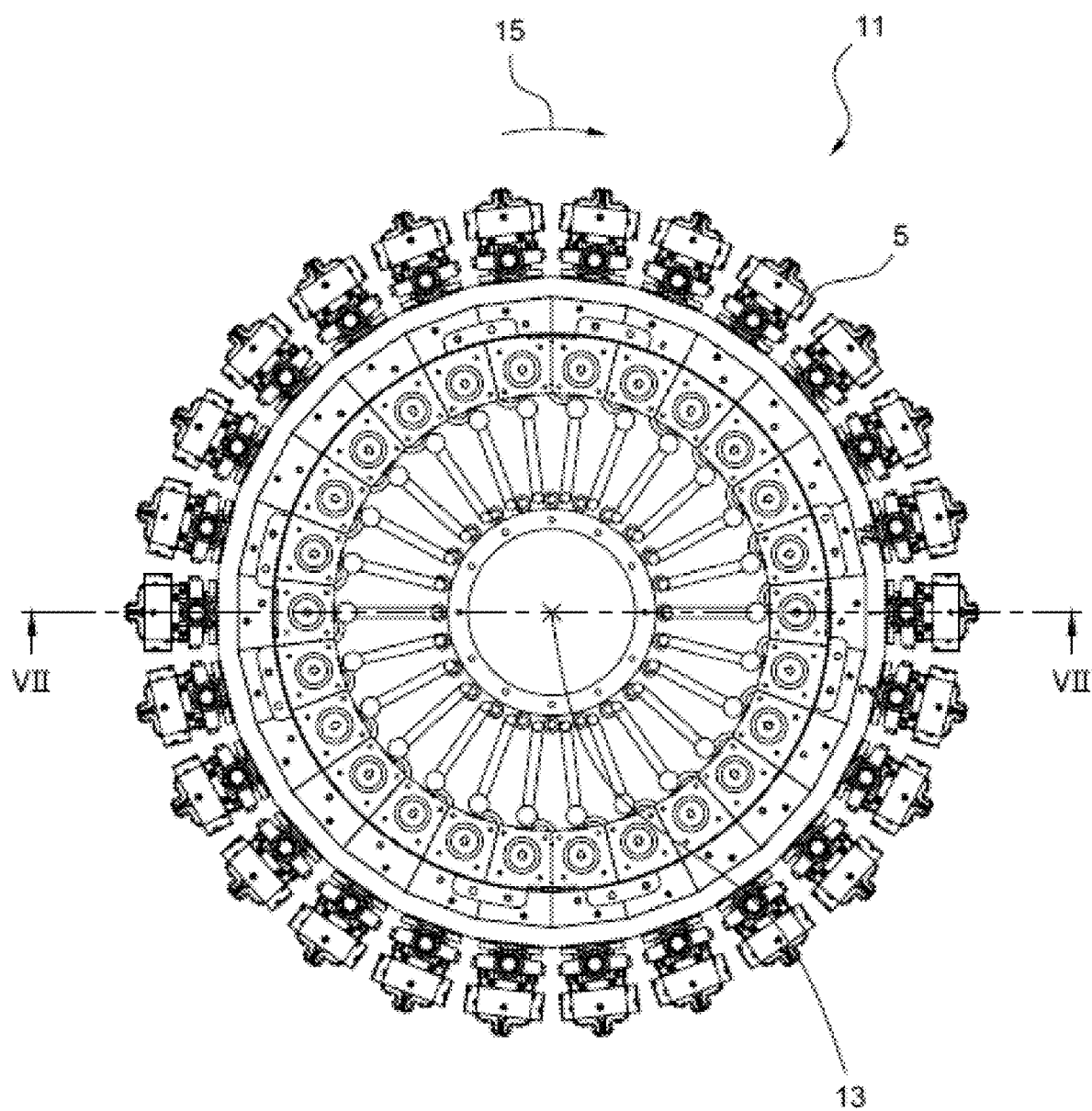
FIG. 6 a top view of a carousel with 26 receptacles.

FIG. 6 shows a top view of an embodiment of a feed device 11 for moving the at least one receptacle 5 from the at least one pre-forming device $1^{I}$, $1^{II}$, $1^{III}$ to the final forming device $1^{IV}$ in the form of a carousel 11. The carousel 11 illustrated in FIG. 6 has 26 receptacles 5, with which a glass intermediate 9 can be received in each case. As a result, up to 26 glass intermediates 9 can be formed into items of glassware simultaneously with the system 3 according to the invention. For this purpose, as described in connection with FIG. 2, a plurality of production devices, such as cooling devices 7, test devices 17, 19, 21, a transfer device 23, pre-forming devices $1^{I}$, $1^{II}$, $1^{III}$ and a final forming device $1^{IV}$ are arranged around the carousel 11, in particular around the carousel axis 13. In particular, up to 26 glass intermediates can thereby be processed simultaneously on different production devices. In particular, a receptacle 5 having a glass intermediate 9 can be moved from processing device to processing device by rotating the carousel 11. This makes it possible, in particular, to reduce the cycle time for producing glassware to the cycle time for processing the glassware in a production device, since the system can complete the production of an item of glassware with any method from one production device to the next.

Figure 7:
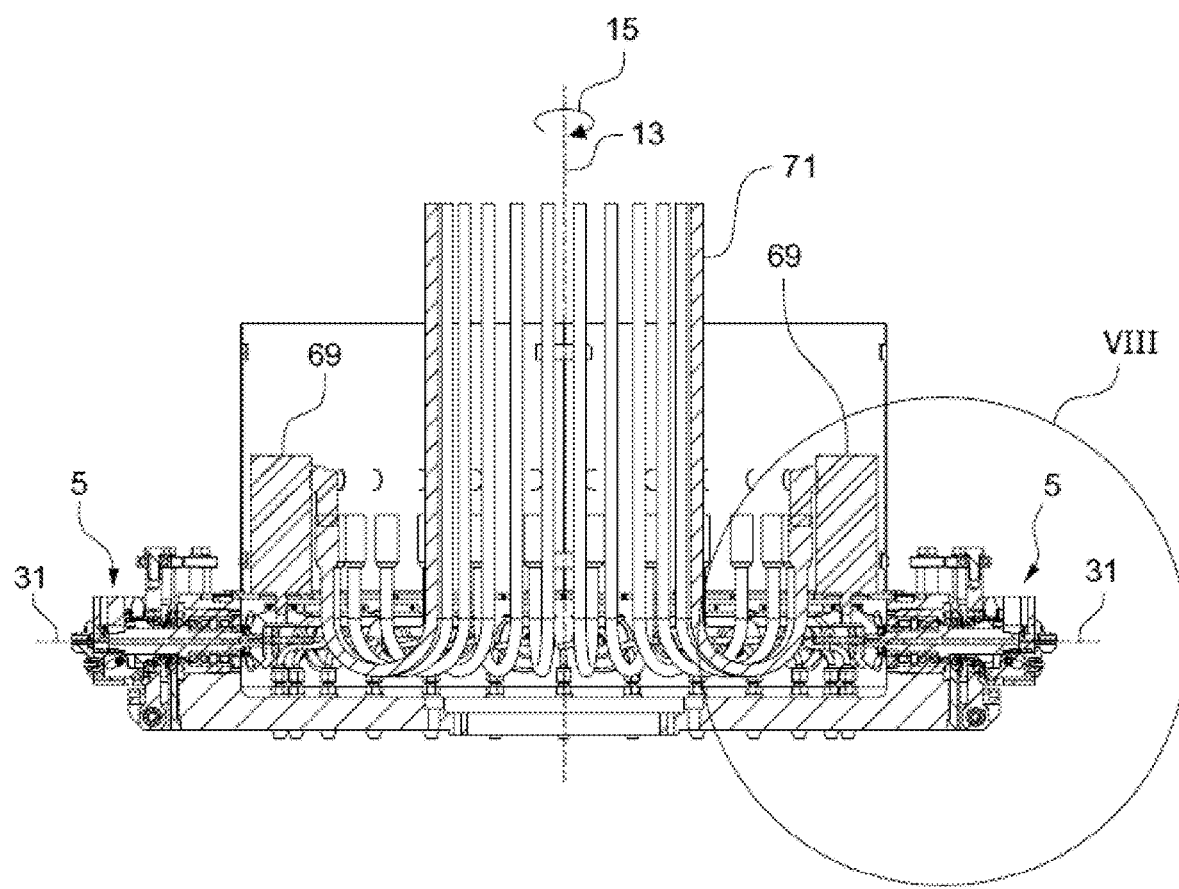
FIG. 7 a cross-sectional view of the carousel from FIG. 6 taken along section line VII-VII.

FIG. 7 shows a cross-sectional view taken along the section line VII-VII from FIG. 6. As can be seen in particular in FIG. 4, each receptacle 5 can be driven via its own receptacle motor 69. Via the receptacle motor 69, the receptacle 5 is rotated about the receptacle rotational axis 31 in each case. In particular, by equipping each receptacle 5 with its own receptacle motor 69, the glass intermediates 9 can be simultaneously rotated about the receptacle rotational axis 31 at different pre-forming devices 1 at different receptacle rotational speeds. In particular, the receptacles 5 can be arranged around the carousel axis 30 in the circumferential direction of production 15. In particular, the receptacles 5 can be attached on the outside of the carousel 11 in the radial direction of the carousel axis 30. In particular, the receptacle motors 69 can be arranged in the radial direction to the carousel axis 30 on the inside of the receptacles 5. In particular, the power supply of the receptacle motors 69 in the radial direction to the receptacle rotational axis 31 can be guided on the inside to the receptacle motors 69.

Figure 8:
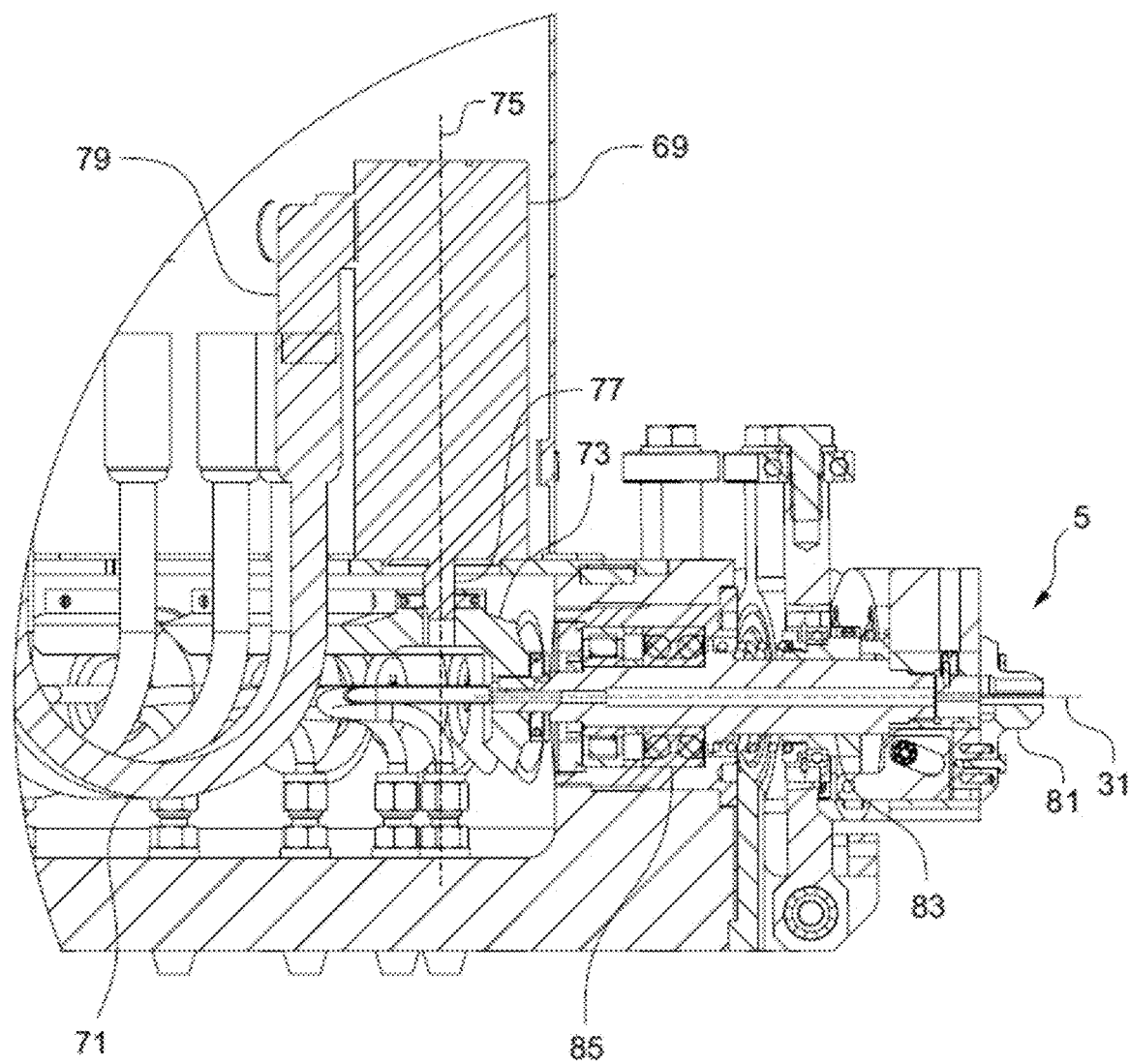
FIG. 8 a cross-sectional view of cutout VIII from FIG. 7.

An enlargement of cutout VIII from FIG. 7 is illustrated in FIG. 8. As illustrated in FIG. 8, the receptacle motors 69 can be coupled to the receptacles 5 via spur gearing 63. As a result, the rotational axis 75 of the motor output shaft 77 can be arranged at an angle, in particular orthogonal, to the receptacle rotational axis 31. In particular, the space requirement of the feed device 11, in particular of the carousel, in the radial direction to the carousel axis 13 can thereby be reduced. Furthermore, the power supply 71 can be connected to the receptacle motor 69 via a plug connection 79. The receptacle 5 can in particular have a chuck 81 for holding the glass intermediate. The chuck can in particular be connected non-rotatably to a receptacle shaft 83. The receptacle shaft 83 can be supported via a radial bearing 85. In particular, the receptacle shaft 83 can be connected to the motor output shaft 77 of the roller motor 69 via the spur gearing 73.

The features disclosed in the above description, the figures and the claims may be important both individually and in any combination for realizing the invention in the various embodiments.

LIST OF REFERENCE SIGNS

1 Device/pre-forming device/final forming device/shaping device (1) ($1^I$, $1^{II}$, $1^{III}$, $1^{IV}$, $1^V$)
2 Heating device/burner
3 System
5 Receptacle
7 Cooling device
9 Glass intermediate
11 Carousel; feed device
13 Carousel axis
15 Direction of production/circumferential direction of production
17 First test device
19 Second test device
21 Third test device
23 Transfer device
25 Forming roller
27 Roller motor
29 Roller rotational axis
31 Receptacle rotational axis
33 Controller
35 Circumferential direction
37 Radial direction
39 Axial direction
41 Hollow cylindrical glass intermediate
43 Glass cone
45 Constricted glass intermediate
47 Thinned glass intermediate
49 Straightened glass intermediate
51 Housing
53 Forming roller housing
55 Collecting basin
57 Discharge line
59 Axial guide
61 Forming mandrel
63 Claw coupling
65 Forming area
67 Annular projection
69 Receptacle motor
71 Power supply
73 Spur gearing
75 Rotational axis of the motor output shaft of the receptacle rotational axis
77 Motor output shaft of receptacle motor
79 Plug connection
81 Chuck
83 Receptacle shaft
85 Radial bearing

The invention claimed is:

1. A method for producing glassware comprising the steps of:
rotating a glass intermediate with a receptacle rotational speed around a receptacle rotational axis;
rotating at least one forming roller with a roller rotational speed around a roller rotational axis;
displacing the at least one forming roller and the glass intermediate into a forming roller contact, wherein the receptacle rotational axis is spaced in a radial direction by an intermediate radius and the roller rotational axis is spaced in the radial direction by a roller radius;
reducing the intermediate radius in the forming roller contact from an initial radius to an end radius by reducing the distance between the roller rotational axis and the receptacle rotational axis; and
reducing the roller rotational speed during the reduction from the initial radius to the end radius.

2. The method according to claim 1, wherein a ratio of the roller rotational speed to the receptacle rotational speed during the method is controlled as a function of the ratio of the intermediate radius to roller radius.

3. The method according to claim 1, wherein a ratio of roller rotational speed to receptacle rotational speed is reduced during the reduction from the initial radius to the end radius.

4. The method according to claim 3, wherein the reduction from the initial radius to the end radius takes place by feeding the at least one forming roller in the radial direction, wherein the roller rotational speed is controlled as a function of the radial position of the at least one forming roller.

5. The method according to claim 1, wherein a ratio of the roller rotational speed to the receptacle rotational speed is controlled as a function of the ratio of intermediate radius to roller radius, in such a manner that a relative speed between the glass intermediate and the at least one forming roller in the forming roller contact is at most 50% of a circumferential speed of the at least one forming roller in the forming roller contact.

6. The method according to claim 1 wherein the receptacle rotational speed and/or the roller rotational speed is controlled via a servomotor during the method.

7. A method for producing rotationally symmetrical glassware comprising the steps of:

forming at least one glass intermediate in at least one pre-forming step in which the at least one glass intermediate is rotated at a pre-forming rotational speed for shaping in a forming roller contact with at least one forming roller, wherein the at least one forming roller is rotated at a pre-forming roller rotational speed; and forming the at least one glass intermediate in a final forming step, in which the at least one glass intermediate is rotated for shaping in a final forming roller contact with a final forming roller at a final forming rotational speed, wherein the final forming roller is rotated at a final roller rotational speed;

wherein the final forming rotational speed is greater or less than the pre-forming rotational speed, and wherein the pre-forming roller rotational speed is controlled as a function of the pre-forming rotational speed, and the final roller rotational speed is controlled as a function of the final forming rotational speed.

8. The method according to claim 7, wherein the pre-forming rotational speed is constant in the forming roller contact of the at least one pre-forming step, and/or wherein the final forming rotational speed is constant in the forming roller contact of the final forming step.

9. The method according to claim 7, wherein the at least one pre-forming step comprises a first pre-forming step with a first pre-forming rotational speed and a last pre-forming step with a last pre-forming rotational speed.

10. The method according to claim 7, wherein the at least one pre-forming step comprises a first pre-forming step with a first pre-forming rotational speed, a last pre-forming step with a last pre-forming rotational speed, and an intermediate pre-forming step with an intermediate pre-forming rotational speed.

11. The method to claim 7, wherein the at least one pre-forming step is carried out in at least one pre-forming device and the final forming step is carried out in a final forming device.

12. The method of claim 11 wherein the at least one glass intermediate is moved to the final forming device after the at least one pre-forming step.

13. The method according to claim 7, wherein the at least one glass intermediate has at least 2 glass intermediates, which are formed in parallel on at least one pre-forming device and on a final forming device.

14. The method according to claim 7, wherein the pre-forming roller rotational speed and final roller rotational speed are controlled so that a) a ratio of circumferential speed of the at least one forming roller and the at least one glass intermediate in the forming roller contact, and b) a ratio of circumferential speed of the final forming roller and the at least one glass intermediate in the final forming roller contact, differ by less than 50 percent.

15. The method according to claim 7, wherein the at least one pre-forming rotational speed is greater or less in magnitude than the final forming rotational speed by at least 10%.

* * * * *